United States Patent
Linden et al.

(10) Patent No.: US 11,787,263 B2
(45) Date of Patent: Oct. 17, 2023

(54) CLIMATE CONTROL VALIDATION FOR K9 POLICE VEHICLES

(71) Applicant: FORD GLOBAL TECHNOLOGIES, LLC, Dearborn, MI (US)

(72) Inventors: Howard Paul Tsvi Linden, Southfield, MI (US); Erick Mogollon, Bloomfield Hills, MI (US); Steve T. Skikun, Commerce Township, MI (US); Randy M. Freiburger, Novi, MI (US); Donald P. Iacovoni, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 17/839,731

(22) Filed: Jun. 14, 2022

(65) Prior Publication Data

US 2022/0314740 A1 Oct. 6, 2022

Related U.S. Application Data

(63) Continuation of application No. 17/181,004, filed on Feb. 22, 2021.

(51) Int. Cl.
*B60H 1/00* (2006.01)

(52) U.S. Cl.
CPC ..... *B60H 1/00807* (2013.01); *B60H 1/00414* (2013.01); *B60H 1/00742* (2013.01); *B60H 1/00978* (2013.01)

(58) Field of Classification Search
CPC ............ B60H 1/00807; B60H 1/00414; B60H 1/00742; B60H 1/00978; B60H 1/00657; B60H 1/0073
See application file for complete search history.

(56) References Cited

U.S. PATENT DOCUMENTS

| | | | | |
|---|---|---|---|---|
| 4,939,911 A | * | 7/1990 | Mandell | F25B 21/02 119/500 |
| 6,345,767 B1 | * | 2/2002 | Burrus, IV | B60H 1/00735 236/1 R |

(Continued)

FOREIGN PATENT DOCUMENTS

CN 204965226 U 1/2016

OTHER PUBLICATIONS

K9 Unit Temperature Monitoring | Monnit Corporation, https://www.monnit.com/solutions/k9-temperature-monitoring/.

*Primary Examiner* — Nelson J Nieves
(74) *Attorney, Agent, or Firm* — Frank L. Lollo; MacMillan, Sobanski & Todd, LLC

(57) ABSTRACT

A wireless mobile device is used to control an HVAC temperature setpoint in a police vehicle containing a police dog. A wireless signal specifying a commanded temperature setting is checked to prevent malicious adjustments by a hacker. The commanded temperature setting is rejected when it is outside a predetermined range between an absolute minimum and an absolute maximum. When an outside ambient temperature is below a cold-day threshold, then the commanded temperature setting is rejected when it requests a temperature decrease. When the outside ambient temperature is above a hot-day threshold, then the commanded temperature setting is rejected when it requests a temperature increase. Otherwise, when the commanded temperature setting is not rejected as being outside the predetermined range, as being a decrease when below the cold-day threshold, or as being an increase when above the hot-day threshold, then the temperature setpoint is set to match the commanded setting.

12 Claims, 5 Drawing Sheets

(56) References Cited

U.S. PATENT DOCUMENTS

| | | | |
|---|---|---|---|
| 7,997,234 B1 | 8/2011 | Hughey | |
| 10,118,593 B2 | 11/2018 | Dellock et al. | |
| 11,084,353 B2 * | 8/2021 | Dearth | B60H 1/00778 |
| 2002/0145516 A1 * | 10/2002 | Moskowitz | B60H 1/008 |
| | | | 340/541 |
| 2002/0161501 A1 | 10/2002 | Dulin | |
| 2006/0241836 A1 * | 10/2006 | Kachouh | B60H 1/00742 |
| | | | 701/49 |
| 2019/0217778 A1 | 7/2019 | Swain et al. | |
| 2020/0180400 A1 | 6/2020 | Cho | |
| 2021/0068312 A1 | 3/2021 | Tobiassen | |
| 2022/0026123 A1 | 1/2022 | Perkovich | |
| 2022/0153227 A1 | 5/2022 | Srivastava | |

* cited by examiner

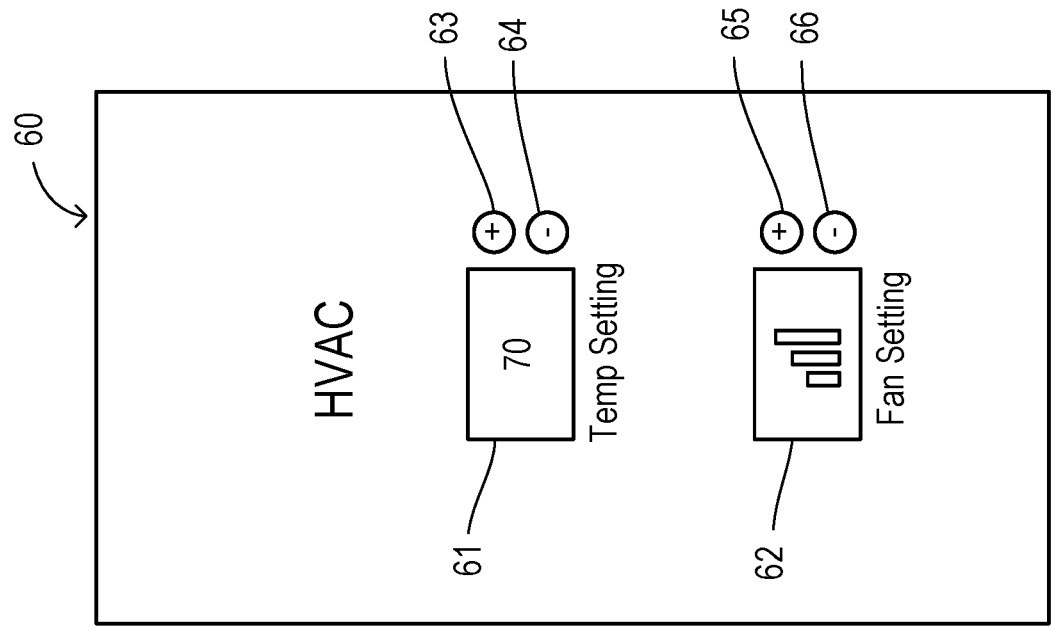

CLIMATE CONTROL VALIDATION FOR K9 POLICE VEHICLES

CROSS REFERENCE TO RELATED APPLICATIONS

This application is a continuation of U.S. application Ser. No. 17/181,004, filed Feb. 22, 2021, now U.S. Pat. No. 11,396,216, issued on Jul. 26, 2022, which is incorporated herein by reference in its entirety.

STATEMENT REGARDING FEDERALLY SPONSORED RESEARCH

Not Applicable.

BACKGROUND OF THE INVENTION

The present invention relates in general to remotely controlling the climate control system of motor vehicles, and, more specifically, to police vehicles adapted to transport and shelter a canine (e.g., police dog).

Specialized vehicles such as those used by police or other law enforcement agencies are known which have accommodation for animals, such as police dogs (i.e., K9 officers). Such a vehicle may include a kennel unit which provides a protected sub-compartment for the police dog. The kennel unit may have the capability to automatically sense whether it is occupied by the police dog and provide a reporting signal to electronic controllers within the vehicle.

Many motorized vehicles are being provided with remote control capabilities that enable a driver or other user of the vehicle to monitor a vehicle and to initiate certain actions by the vehicle without having to physically enter or access the vehicle. Some available actions accessible by remote control may include an engine starting function, door locking and unlocking, raising or lowering windows, activation of a climate control or heating, ventilating, air-conditioning (HVAC) system, and adjustment of a target temperature setting of the HVAC. The remote controller can be implemented as an application on a smartphone which communicates with the vehicle using a cellular data connection. One example of such a system is the FordPass' smartphone platform from Ford Motor Company combined with the Sync® Connect™ system option available on some vehicles. For police vehicles from Ford Motor Company such as the Police Interceptor® vehicle, a Ford Police Mobile App enables remote access to many functions including HVAC temperature adjustment.

The police K9 vehicle may utilize a cellular network for the remote vehicle communication which allows a police officer, a police dispatcher, or other system administrator to send critical commands to the vehicle such as turning the HVAC on and off and/or adjusting HVAC temperatures settings at times when the vehicle carries a kenneled K9 officer. There is a concern that these communication signals could be attacked by a hacker who may then cause the vehicle to behave inappropriately and may possibly threaten the health and wellbeing of the K9 officer. For example, a hacker may gain unauthorized access and send commands for disabling the air conditioning or setting the HVAC to a high heat setting on a hot day, potentially harming the K9 officer as a result of heat exhaustion. When in a cold environment, the hacker might send a command to turn the HVAC to an extreme low temperature setting, causing harm to the K9 Officer by making the cabin dangerously cold.

SUMMARY OF THE INVENTION

In some embodiments, a vehicle controller (e.g., a customer interface module (CIM) in a police vehicle) is adapted to wirelessly communicate with a mobile device and to change HVAC control settings in a secure manner. The CIM may also communicate with a Cloud (Internet-based) service such as a weather service and/or a police command and control center. The CIM can be configured to check the validity and/or possible malicious intent of command received for changing the HVAC settings, to reject any commands that appear to be malicious intent, and to report to the user (e.g., police officer or dispatcher) of an attempted hack.

In one aspect of the invention, a method is provided for controlling an HVAC temperature setpoint in a vehicle. A wireless signal is received specifying a commanded temperature setting. The commanded temperature setting is rejected when it is outside a predetermined range between an absolute minimum and an absolute maximum. An outside ambient temperature is determined. When the outside ambient temperature is below a cold-day threshold, then the commanded temperature setting is rejected when it requests a decrease in temperature. When the outside ambient temperature is above a hot-day threshold, then the commanded temperature setting is rejected when it requests an increase in temperature. Otherwise, when the commanded temperature setting is not rejected as being outside the predetermined range, a decrease when below the cold-day threshold, or an increase when above the hot-day threshold, then the HVAC temperature setpoint is set to match the commanded temperature setting.

BRIEF DESCRIPTION OF THE DRAWINGS

FIGS. 3, 4, 5, and 6 show respective screenshots of a remote control app executed on a mobile device to monitor and adjust vehicle systems while located outside the vehicle.

DETAILED DESCRIPTION OF PREFERRED EMBODIMENTS

Figure 1:
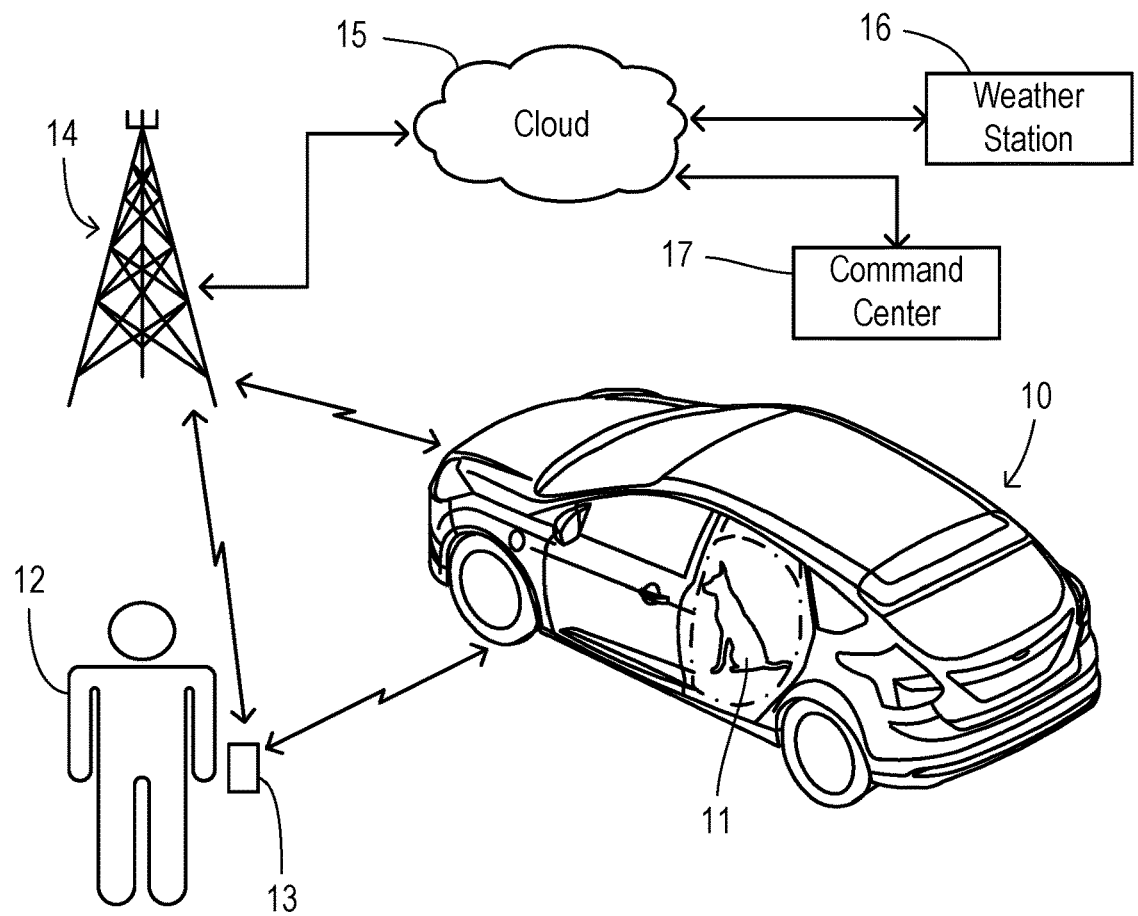
FIG. 1 is a diagram depicting a K9 police vehicle and remote assets which are in wireless communication with the vehicle.

Referring to FIG. 1, a police vehicle 10 is partially broken away to show a K9 officer 11 in the vehicle interior (e.g., in a kennel unit) while vehicle 10 is unattended. An officer 12 carries a mobile device 13 (e.g., a smartphone or a tablet) for communicating wirelessly with a cellular network 14. Cellular network 14 further communicates with a cellular modem (not shown) in vehicle 10 and with a digital Cloud network 15 (or Internet) for linking to a weather station 16 and/or a command center 17. Using an appropriately configured application program on smartphone 13, officer 12 can initiate the transmission of various commands to corresponding vehicle systems within vehicle 10 via cellular network 14. In some embodiments, commands and data can be exchanged with vehicle 10 using direct wireless communication such as a Wi-Fi connection or a Bluetooth connection.

As further explained below, the invention may use independently reported values for an outside ambient temperature in the vicinity of vehicle 10 wherein the temperature values are reported by a third party independently of any components in vehicle 10 (in case any temperature obtained from an on-vehicle sensor may have been compromised by a hacker). For example, weather station 16 may include a temperature sensor at an automated data collection site of the National Weather Service, other public or private data sources, or may be an intermediary which consolidates temperature measurements from various sources to provide access to current temperature data for particular areas which can retrieved based on geographic coordinates or place names. Command center 17 (such as a police dispatch/communication center) may also retrieve temperature data to be transmitted to mobile device 13. A user at command center 17 can also initiate remote control commands to be issued to vehicle 10 via cellular network 14 and Cloud network 15.

Because of interception of wireless communications (e.g., within cellular network 14 or other wireless channels such as WiFi), a potential exists for a hacker to gain illicit access to vehicle in order to initiate inappropriate temperature commands to the HVAC system. As a validation against such attempts, the independently derived value for the outside ambient air temperature is used to prevent against the hacking of internal sensor data. Furthermore, various validity tests are applied to any commands to modify a temperature setpoint in order to prevent conditions which are potentially dangerous to the K9 officer.

Figure 2:
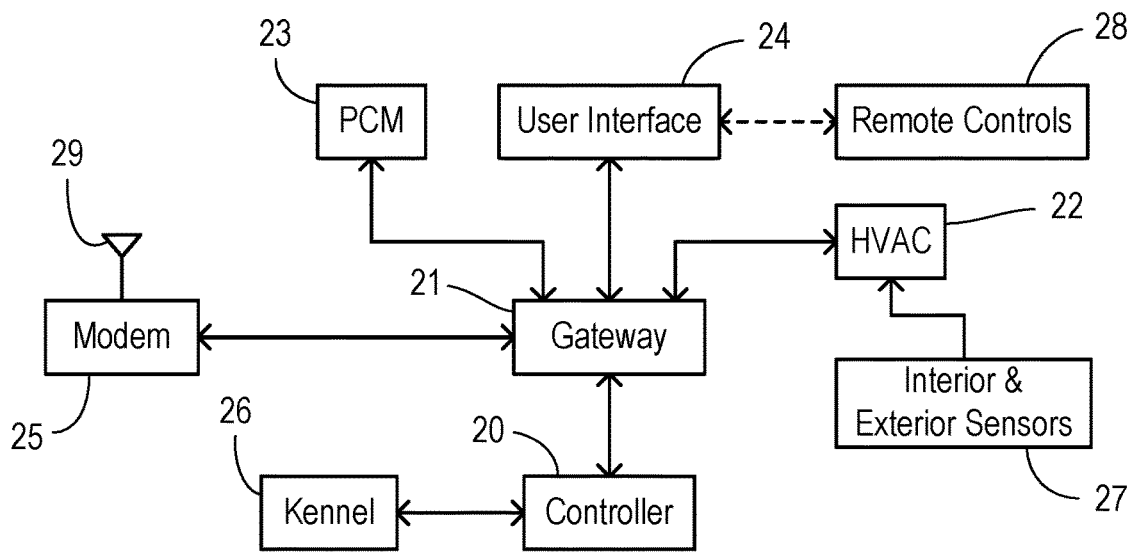
FIG. 2 is a block diagram showing one preferred embodiment of the invention.

FIG. 2 shows a system of the invention wherein a controller 20 is connected with a gateway 21 for providing interaction with various vehicle electronic modules including an HVAC controller 22, a powertrain control module 23, a user interface 24, and a cellular data modem 25. A kennel unit 26 for housing a K9 officer may include features such as a sensor for reporting to controller 20 whether kennel unit 26 is occupied. HVAC controller 22 is further connected to interior and exterior temperature sensors 27. Various remote controls 28 such as a key fob, RF transponder, Bluetooth controller, or other mobile device can interact wirelessly with user interface 24 in order to transmit various commands. Remote controls 28 may further include a smartphone or tablet with a mobile control app communicating with user interface 24 via modem 25 and antenna 29 to transmit the commands (e.g., adjustments to be made to a temperature setpoint in HVAC controller 22).

Figure 4:
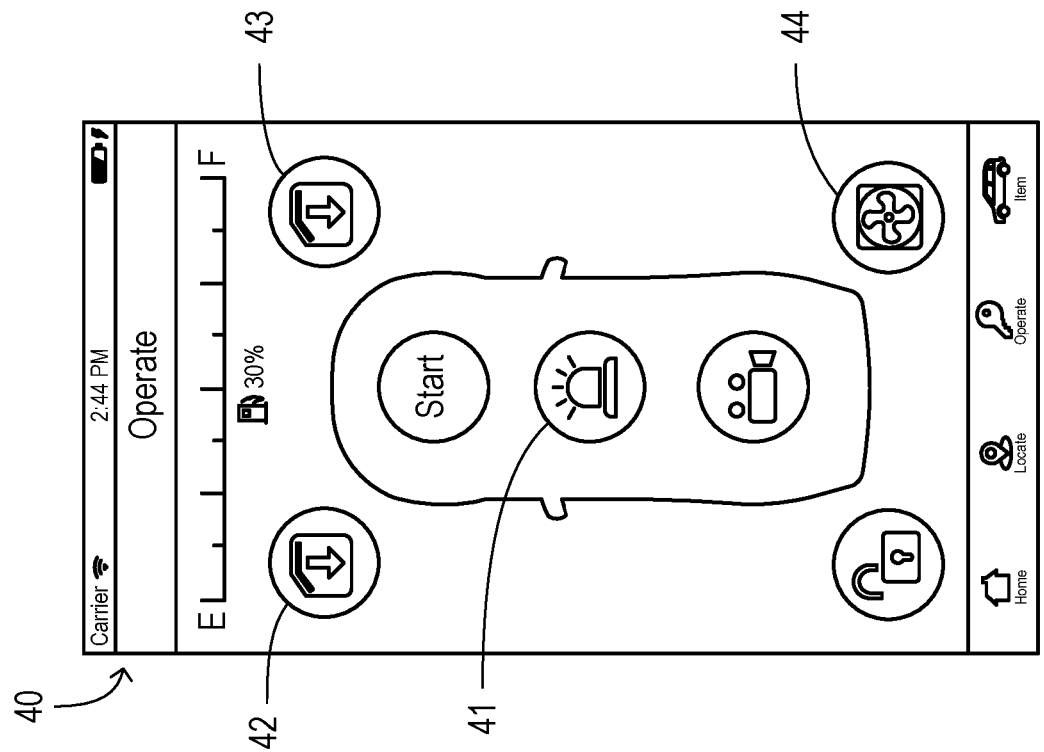
Figure 3:
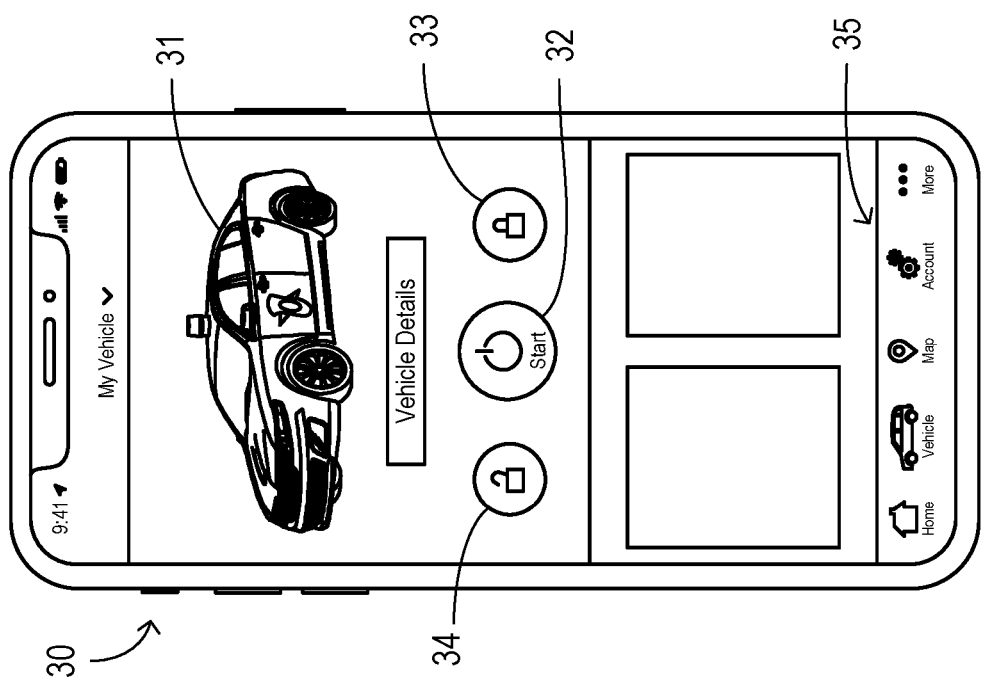

FIG. 3 shows a smartphone 30 executing a mobile application for interfacing with the vehicle systems. A home screen shown in FIG. 3 may include an icon 31 for identifying a particular vehicle being controlled, a remote start icon 32, door lock and unlock icons 33 and 34, and page select icons 35. FIG. 4 shows a screenshot 40 of a mobile app specially adapted for police vehicles wherein additional controls are made available such as a siren control icon 41, window down icon 42, window up icon 43, and an HVAC selection icon 44. A user can access a status screen 50 as shown in FIG. 5 which displays various current settings and sensed conditions associated with the vehicle such as temperature, engine on/off status, the up/down status of various windows, and more.

FIG. 6 shows an HVAC adjustment screen 60 having a current temperature display area 61 and a current fan speed display area 62. Temperature adjustment buttons 63 and 64 are provided for raising and lowering a commanded temperature setpoint. Fan speed increase button 65 and fan speed decrease button 66 are provided for altering the speed of a blower fan. Thus, while away from the police vehicle, a police officer can check the vehicle status, can ensure that a car is running, and can adjust a climate control temperature setting as needed to provide a comfortable environment for a police dog that may be locked in an unattended vehicle.

Figure 7:
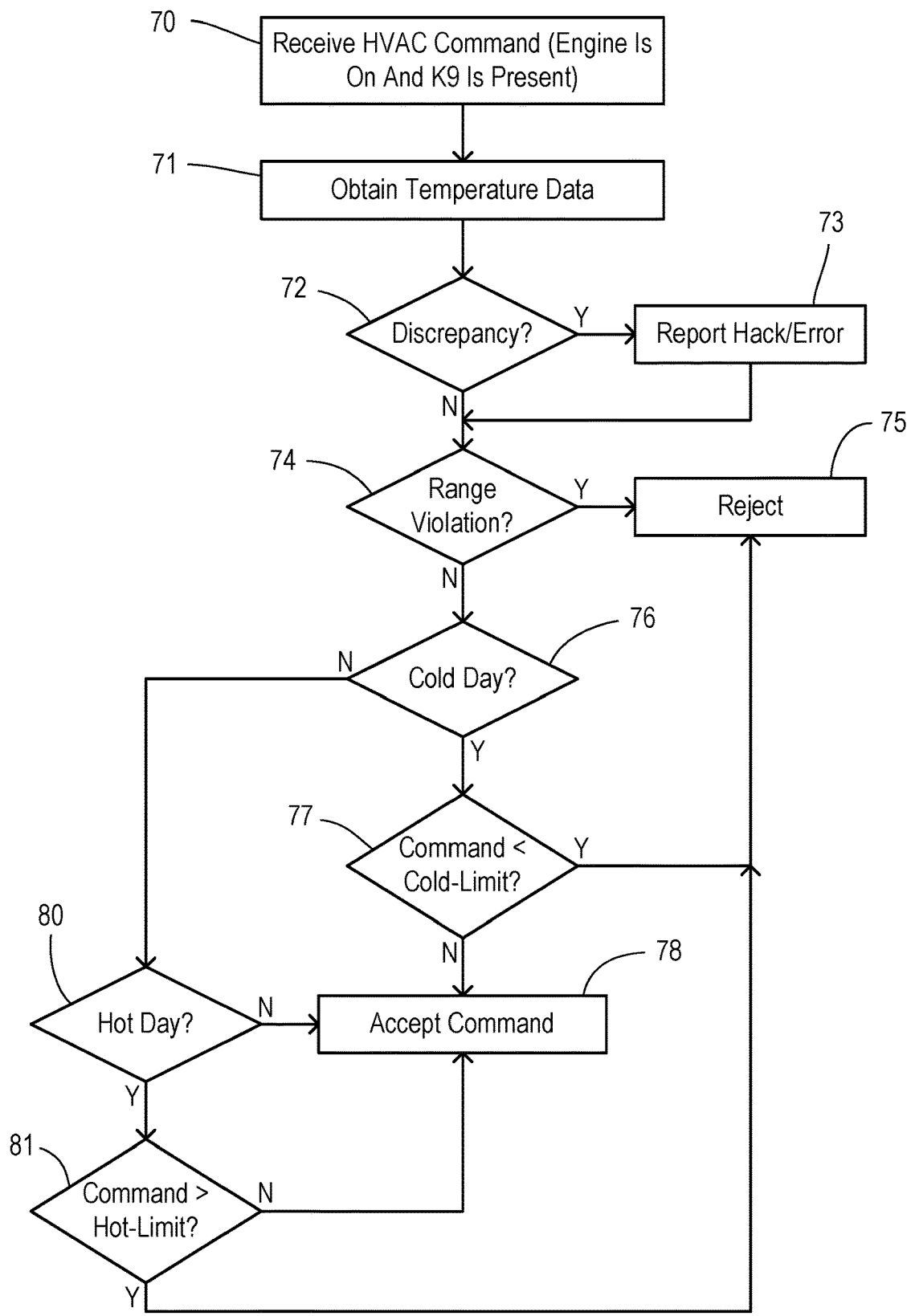
FIG. 7 is a flowchart showing one preferred method of the invention.

FIG. 7 shows a method of preventing potentially harmful changes to an HVAC temperature setpoint. In step 70, a wireless signal is received specifying a commanded temperature setting. In a typical internal combustion engine, temperature controls for the HVAC system are available only when the engine is running. Utilization of the method can be conditioned upon whether a police dog is, in fact, present within the vehicle or it can be used regardless of whether the police dog is present. It may be desirable to allow extreme temperature settings when the police dog is not present for the purpose of sanitizing the vehicle interior, for example.

After a command is received to perform a modification to the HVAC temperature setpoint, temperature data is obtained in step 71. For example, an outside ambient temperature is determined by 1) measuring with a vehicle-mounted external temperature sensor, and/or 2) retrieving a reported temperature from a remote data source. In step 72, any significant discrepancy between the sensed ambient temperature and reported ambient temperature is determined. For example, a temperature difference between the exterior temperature measurement and the reported temperature is calculated and compared to a threshold. Due to local variations, some difference is to be expected between a measured temperature at the vehicle and a temperature reported by a weather service for the city where the vehicle is located. However, a difference above a certain level (e.g., a difference of 5° F.) would indicate either a sensor error or a data modification made by a hacker. If the temperature difference is greater than the threshold, then the occurrence of a possible hack or equipment error is reported to a user (e.g., an administrator at the command center or the police officer using the vehicle). In some embodiments, the process may halt at step 73 without taking any other action in response to the remote command.

In some embodiments, the process may continue based on selecting one of the available measures of the ambient temperature that may be the most reliable. For example, the reported temperature may be used as the outside ambient temperature when the temperature difference is greater than the threshold since the reported value may be more secure against hacking. On the other hand, when the temperature difference is less than a threshold (indicating that the local measurement is likely to be reliable) then the exterior temperature measurement from the on-vehicle sensor is used as the outside ambient temperature for the remainder of the process.

A check is performed in step 74 to determine whether the commanded temperature represents a violation of a temperature range which is meant to protect a wellbeing of the canine. For example, a predetermined range between an absolute minimum and an absolute maximum is imposed. A preferred absolute minimum may be about 50° F. (10° C.), and a preferred absolute maximum may be about 80° F. (27° C.). When the commanded temperature setting is outside the range (e.g., is less than 10° C. or greater than 27° C.) then the command is rejected in step 75. The rejection may include halting the processing of the command and sending a message to the human administrator (e.g., dispatcher or police officer) to inform them of the invalid command.

Even when the command does not violate the absolute temperature range, potentially harmful temperatures could still be created in the vehicle if cooling is initiated on a day that is already cold or if heating is initiated on a day that is already hot. To prevent this, a check is performed in step 76 to determine whether the outside ambient temperature is below a cold-day threshold. One preferred value for the cold-day threshold is about 59° F. (15° C.). If outside ambient temperature is below a cold-day threshold, then the commanded temperature setting is examined to determine whether it requests a decrease in temperature in step 77. If the command would further decrease the temperature then the command is rejected in step 75. Otherwise, the command is accepted in step 78 and it is executed by the HVAC controller.

When the outside ambient temperature is not below the cold-day threshold in step 76, then a check is performed in step 80 to determine whether the outside ambient temperature is above a hot-day threshold. If not, then the command is accepted in step 78 and it is executed by the HVAC controller. If the outside ambient temperature is above a hot-day threshold, then the commanded temperature setting is examined to determine whether it requests an increase in temperature in step 81. If the command would further increase the temperature then the command is rejected in step 75. Otherwise, the command is accepted in step 78 and it is executed by the HVAC controller. Thus, whenever the commanded temperature setting is not rejected as being outside the predetermined range, a request for a decrease when below the cold-day threshold, or a request for an increase when above the hot-day threshold, then the HVAC temperature setpoint is to match the commanded temperature.

Figure 8:
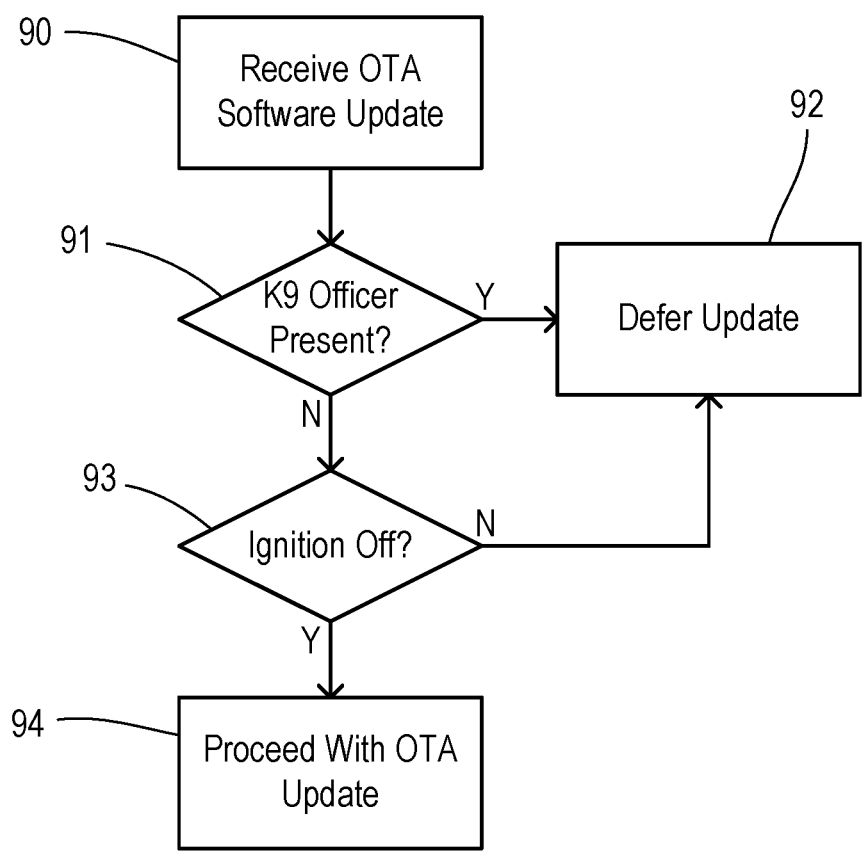
FIG. 8 is a flowchart showing another method of the invention.

Using the availability of cellular data communication, many vehicles are being provided with an ability to conduct OTA software updates for one or more electronic modules. The OTA updates may be pushed to the vehicle from a Cloud server, for example. The performance of an update may increase a risk of hacking. In some embodiments, updating of any electronic module containing software that is updatable over the air (OTA) from a remote source may be prevented when providing a temperature failsafe operation for a K9 officer in an unattended vehicle. A controller for managing the updates operates using a method as shown in FIG. 8. A remote request (e.g., a push message) for providing an OTA update is received in step 90. A check is performed in step 91 to determine whether the canine is present in the vehicle. If so, then action is taken in step 92 to defer the OTA update while the canine is present. It may also be desirable to ensure that changes are not made to any vehicle programming when the vehicle is operating. Therefore, if the canine is not present, then another check may be performed in step 93 to determine whether the ignition is off. If the ignition is not off, then the OTA update is again deferred in step 92. Otherwise, the OTA update is allowed to proceed in step 94.

What is claimed is:

1. A method of remotely controlling an HVAC temperature setpoint in a vehicle, wherein the vehicle includes a kennel for housing the canine, comprising the steps of:
receiving a wireless signal specifying a commanded temperature setting;
checking for a presence of a canine in the vehicle, wherein the kennel automatically senses an occupancy of the kennel;
checking whether the vehicle is attended by a user;
if the canine is present and the vehicle is unattended by the user then responding to the commanded temperature setting according to a validation process which rejects the commanded temperature setting when it violates a predetermined temperature range; and
if the canine is not present or the vehicle is attended by the user then responding to the commanded temperature setting without the validation process.

2. The method of claim 1 wherein the predetermined temperature range extends between an absolute minimum and an absolute maximum.

3. The method of claim 1 further comprising the steps of:
determining an outside ambient temperature; and
comparing the outside ambient temperature to a cold-day threshold, wherein the predetermined temperature range is comprised of temperatures below the outside ambient temperature when the outside ambient temperature is less than the cold-day threshold.

4. The method of claim 1 further comprising the steps of:
determining an outside ambient temperature; and
comparing the outside ambient temperature to a hot-day threshold, wherein the hot-day threshold is greater than the cold-day threshold, wherein the predetermined temperature range is comprised of temperatures above the outside ambient temperature when the outside ambient temperature is greater than the hot-day threshold.

5. A vehicle, comprising:
an interior cabin adapted to transport a canine;
an HVAC system configured to heat air and to cool air provided to the cabin according to an HVAC temperature setpoint;
a transceiver adapted for wireless communication with a remote handheld device of a user to exchange remote commands including a commanded temperature setting;
a data source providing an outside ambient temperature; and
a controller configured to 1) check for a presence of the canine, 2) check whether the vehicle is attended by the user, 3) if the canine is present and the vehicle is unattended by the user then responding to the commanded temperature setting according to a validation process which rejects the commanded temperature setting when it violates a predetermined temperature range, wherein the predetermined temperature range extends between an absolute minimum and an absolute maximum, and 4) if the canine is not present or the vehicle is attended by the user then responding to the commanded temperature setting without the validation process.

6. The vehicle of claim 5 wherein the interior cabin includes a kennel for housing the canine, wherein the kennel automatically senses an occupancy of the canine within the kennel.

7. The vehicle of claim 5 wherein the controller is further configured to compare the outside ambient temperature to a cold-day threshold, wherein the predetermined temperature range is comprised of temperatures below the outside ambient temperature when the outside ambient temperature is less than the cold-day threshold.

8. The vehicle of claim 5 wherein the controller is further configured to compare the outside ambient temperature to a hot-day threshold, wherein the hot-day threshold is greater than the cold-day threshold, wherein the predetermined temperature range is comprised of temperatures above the outside ambient temperature when the outside ambient temperature is greater than the hot-day threshold.

9. A vehicle, comprising:
an interior cabin;

a kennel in the interior cabin adapted to transport a canine, wherein the kennel is configured to automatically sense an occupancy of the canine within the kennel;

an HVAC system configured to heat air and to cool air provided to the cabin according to an HVAC temperature setpoint;

a transceiver adapted for wireless communication with a remote handheld device of a user to exchange remote commands including a commanded temperature setting;

a data source providing an outside ambient temperature; and a controller configured to 1) check for a presence of the canine, 2) check whether the vehicle is attended by the user, 3) if the canine is present and the vehicle is unattended by the user then responding to the commanded temperature setting according to a validation process which rejects the commanded temperature setting when it violates a predetermined temperature range, and 4) if the canine is not present or the vehicle is attended by the user then responding to the commanded temperature setting without the validation process.

10. The vehicle of claim 9 wherein the predetermined temperature range extends between an absolute minimum and an absolute maximum.

11. The vehicle of claim 9 wherein the controller is further configured to compare the outside ambient temperature to a cold-day threshold, wherein the predetermined temperature range is comprised of temperatures below the outside ambient temperature when the outside ambient temperature is less than the cold-day threshold.

12. The vehicle of claim 9 wherein the controller is further configured to compare the outside ambient temperature to a hot-day threshold, wherein the hot-day threshold is greater than the cold-day threshold, wherein the predetermined temperature range is comprised of temperatures above the outside ambient temperature when the outside ambient temperature is greater than the hot-day threshold.

* * * * *